United States Patent

[11] 3,571,488

[72] Inventor William R. Douglass
 Somerset, N.J.
[21] Appl. No. 815,310
[22] Filed Apr. 11, 1969
[45] Patented Mar. 16, 1971
[73] Assignee Federal Pacific Electric Company
 Newark, N.J.

[54] ENCLOSED BUS DUCT
 8 Claims, 5 Drawing Figs.

[52] U.S. Cl. .................................................. 174/68,
 174/88
[51] Int. Cl. ..................................................... H02g 5/06,
 H02g 5/08
[50] Field of Search........................................... 174/68 (B),
 16 (B), 68 (B), 99 (B), 71 (B), 72 (B); 307/147

[56] References Cited
 UNITED STATES PATENTS
2,350,601 6/1944 Frank et al..................... 174/88BX
2,992,291 7/1961 Kussy........................... 174/88B

*Primary Examiner*—Darrell L. Clay
*Attorneys*—Paul S. Martin and Richard M. Rabkin ABSTRACT: The disclosed bus duct has bus bars stacked face-to-face and contained in a pair of confronting channels forming part of a heat-dissipating and structurally stiff elongated housing. Through electrical insulation that separates the bus bars from each other and from the housing, the stack of bus bars is edgewise and laterally in intimate heat-transfer relation to the channels of the housing. Stiffening pairs of elongated sheet steel members that are J-shaped in cross section are united to the flanges of the channels. The latter are of nonmagnetic material, especially aluminum to avoid increasing the inductance of the bus bars. The housing includes sheet metal cover parts at the joint-forming ends of the bus bars. The mutually contacting portions of the cover parts and the housing engaged by the cover parts have low-resistance electroplated contact surfaces.

Patented March 16, 1971 3,571,488
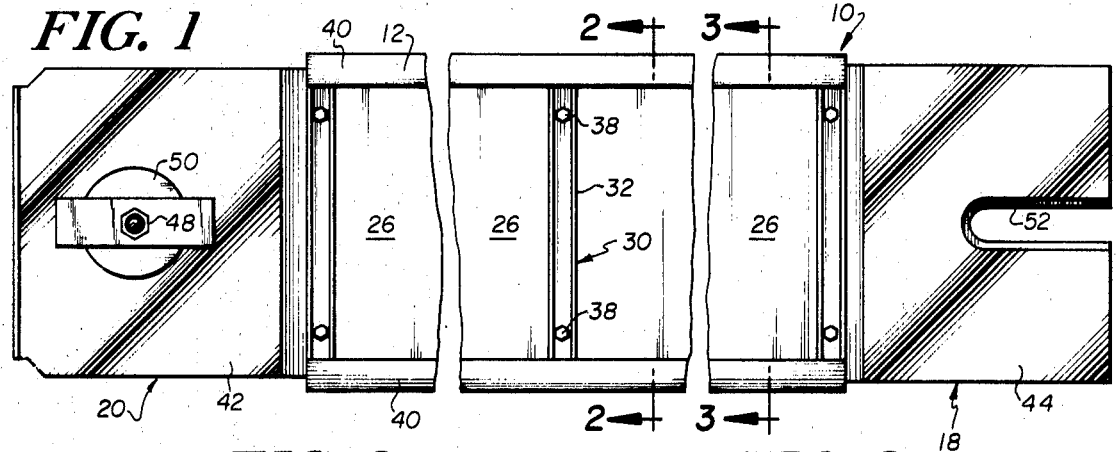
FIG. 1
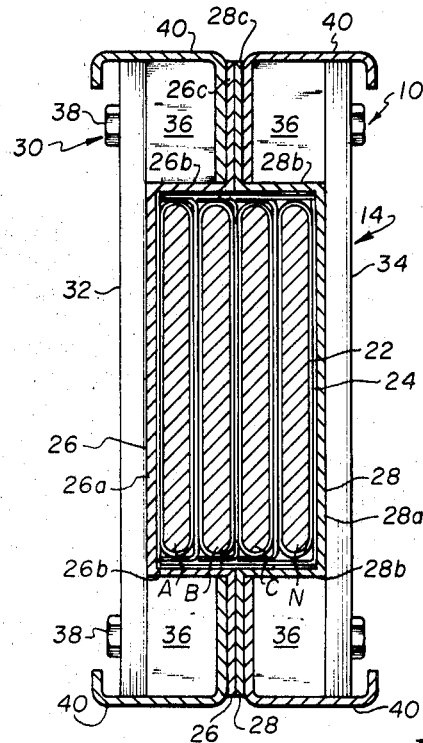
FIG. 2
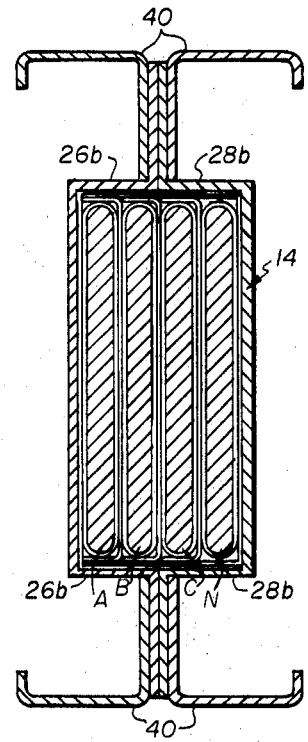
FIG. 3
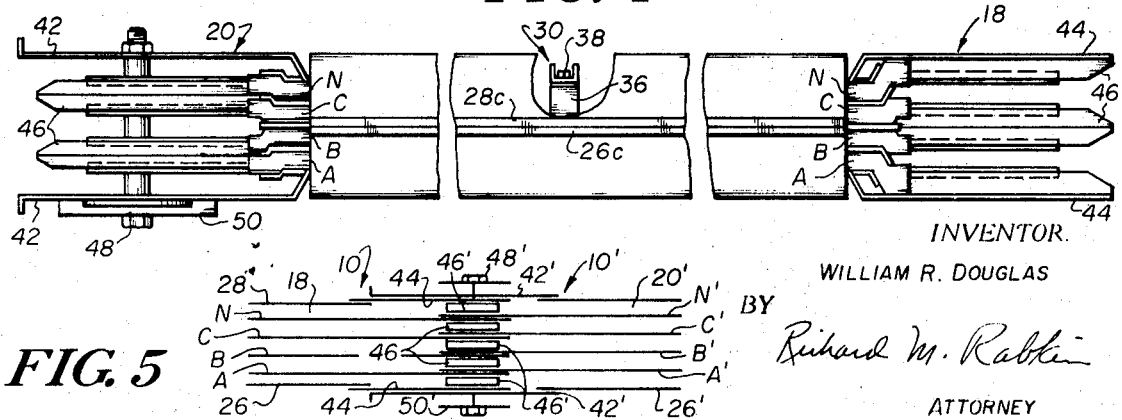
FIG. 4
FIG. 5
INVENTOR.
WILLIAM R. DOUGLAS
BY
Richard M. Rabkin
ATTORNEY

ENCLOSED BUS DUCT

This invention relates to electric power distribution systems and more particularly to bus duct structures.

It is an object of this invention to provide a new and improved bus duct structure.

Another object of the invention is to provide an improved low-impedance bus duct construction having assured structural stability.

A further object of this invention is to provide a compact bus duct structure which is totally enclosed.

Yet another object of this invention is to provide an improved bus duct structure including improved heat dissipation.

Still another object of this invention is to provide a bus duct structure incorporating an improved ground return path.

The above and other objects and advantages of the invention will become apparent from the following specification when taken in conjunction with the accompanying drawings. In the drawings:

FIG. 1 is a view in side elevation, of a bus structure embodying certain aspects of the invention;

FIG. 2 is a sectional view taken along the line 2-2 of FIG. 1 on a larger scale;

FIG. 3 is a sectional view, taken along the line 3-3 of FIG. 1 on a larger scale;

FIG. 4 is a plan view of the bus duct structure of FIG. 1; and

FIG. 5 is a diagrammatic representation of the connection of two succeeding bus duct sections.

Referring to the drawings there is illustrated a unit length (nominally 10 feet long) feeder bus duct structure that comprises a metallic bus duct housing 12 and an arrayed assembly 14 of bus bar conductors A, B, C, and N. The presently illustrated bus duct is intended for use in a three phase, four wire power distribution circuit at 1,000 A. 600 v. with one-fourth inches by 4 inches Alum. bars. Other well-known arrangements include the three phase, three wire circuit which utilizes three full size bus bars. Each of the bus bars A, B, C, N is generally rectangular in cross section and is provided with generally flat broad faces and narrow faces. The broad faces are positioned in substantially parallel face-to-face relationship in serial array of parallel planes. The narrow faces are aligned in a pair of spaced parallel planes perpendicular to the planes of the broad faces of the bars. Each of the bus bars has its ends at offset at the ends of the unit length 18, 20 to provide overlapping connection to corresponding bus bars of the next adjacent section connected thereto as will be described in detail below.

Referring to FIGS. 2 and 3 each bus bar is provided with a layer of continuous insulation 22 except for portions of the offset ends of the bars. The offset portions are intended for connection between successive lengths of bus duct and are plated with a high conductivity metal. Each bar is encapsulated in insulation 22 having the desired electrical properties for the intended application. As for example a typical layer of insulation has a dielectric strength of 1,000 volts per mil with a 20 mil coating thickness. It has been found to be particularly advantageous to utilize the fluidized bed process for applying a continuous, smooth, uniform layer of insulation to avoid special inserts and hand taping at bends or offsets in the bars. The insulated bus bars are separated from each other by a layer 24 of secondary insulation of "Mylar" in sheet form which has a dielectric strength of 2,800 volts per mil. A layer of the secondary insulation is also interposed between the broad faces of the outermost bus bars and adjacent portions of the housing 12. The metallic duct housing 12 encloses the assembly of bars 14 and includes a pair of opposed parallel channel members 26, 28 that extend substantially the full length of the section 10. Channels 26, 28 are formed of aluminum for good thermal and electrical conductivity. Each of the channels 26, 28 has a bottom portion 26a, 28a that conforms to the wide faces of the bus bars. Additionally, the channels 26, 28 each has a pair of sidewalls 26b, 28b that extend in the same direction from the bottom portion and a pair of coplanar flange portions 26c, 28c that extend oppositely from the respective wall portions 26b, 28b. The sidewalls 26b, 28b are proportioned to the number and thickness of the bars within the housing 12 so that when the channels 26, 28 are clamped together the bars are securely retained in position in the housing.

The bus bar assembly 14 is held in place in the housing 12, and the housing portions are clamped together, by means of spaced clamping means 30 along the section 10. Each clamping means 30 includes a pair of clamping channels 32, 34, spacer blocks 36, and screw fasteners 38. Fasteners 38 also secure to the housing 10 opposed pairs of section-length J-shaped or channel-edged members 40. The members 40 of each pair have their long sides butted together on opposite sides of the channel flanges 26c, 28c. The channel edge of the steel reinforcing members 40 provides additional structural reinforcement to the bus duct structure and also provides a convenient means for attaching means (not shown) for installing the bus duct. As the fasteners 38 are tightened the main channel members 26, 28 are brought snugly into engagement with one another and with the bus bar assembly 14 by the clamping channels 32, 34. The fact that the steel stiffening members are spaced away from the bus bars at the extremities of the housing is advantageous in several ways. As for example, their stiffening effect on the housing is greatest at that distance. They provide a rigid point of connection for the bus duct hanger system, and their maximum separation from the current carrying bus bars reduces their influence on the system impedance.

Joint covers 42 and 44, of aluminum, are secured to the ends of the bus duct housing by the fasteners that clamp the channels 26, 28 together adjacent the offset ends 16, 18. While a good electrical connection between the channels and the joint covers is made by clamping, a lower resistance connection is possible if the channels 26, 28 and the bus duct joint covers are plated at least at their mutual junctions. The plating of the joint covers also provides a current path of significantly improved conductivity surrounding the joint and between sections that is integral with the bus bar array. Advantageously, the entire channels 26, 28 and the joint covers are plated with a metal of high conductivity, such as tin, by a process in the well-known art. The low-impedance ground return path thus provided insures that sufficiently high current will flow through the bars in the event of a phase to ground fault to cause tripping of the associated circuit breaker. Plate members (not shown) overlying the joint are secured to the J-shaped members 40 to complete the joint enclosure.

The narrow faces of the bus bars A, B, C, N are in close proximity to and in good heat transfer relationship with the side walls 26b, 28b of the channels. The bars are substantially directly in engagement with the channels being separated only by the layer 24 of secondary insulation. The broad faces of the outermost bars A, N are in contact and in good heat transfer relationship with the channel walls 26a, 28a. The relatively short distances from the innermost portions of the inner bars B, C to the exterior surfaces provides improved heat dissipation so that, when carrying rated current, the temperature rise of the duct is nominal (below the rated temperature of insulation). The described structure is substantially fabricated from aluminum and has extensive heat transfer surfaces to those portions that are not aluminum so as to provide improved heat dissipation from all portions of the bus duct.

Referring to FIGS. 1, 4 and 5 the mode of connection of successive lengths of bus duct will now be discussed. As previously described the opposite ends of the duct and bus bars A, B, c, N are offset at 16, 18. The plated bare ends of the bars are received in tapered-end insulators 46 which leave a broad face of the bar free for overlapping engagement with a corresponding bus bar of the next-in-line duct section. The insulators separate the bars of the different phases from one another and from the housing. The bar ends at 20 are provided with an insulated through bolt 48 and heavy spring washers 50 carried by the housing. The bar ends and housing at 18 are notched at 52 to accept the through bolt 48' of the next-in-line duct section when assembled thereto. The duct sections 10, 10' are connected together by interdigitating the offset ends of their respective bus bars A, B, C, N, A', B', C', N' and their associated insulators. Through bolt 48' is then tightened and brings together the stack of bus bars, insulators, and the plated housing elements 42, 44. The plated ends of the conductive housing provides a low-impedance section path in the event of bus duct failure. Such a low-impedance return path is important in that it permits the fault current to rise to a level high enough to cause operation of the associated circuit protective means (not shown) through which the run of the bus duct is energized. If the duct housing were to form a high impedance return path then the possibility exists that destructive arcing could destroy the bus duct without causing operation of the protective device. The utilization of the housing structure per se as a highly conductive element, obviates the necessity of a separate ground bus bar or other like structure, thus providing an economical, reliable structure of insured integrity.

While only one embodiment of the invention has been shown and described in detail it will be understood by those skilled in the art that various changes and modifications may be made therein without departing from the spirit and scope of the invention.

I claim:

1. A unit length of bus duct comprising an elongated housing and a plurality of bus bars having broad and narrow faces, said bus bars having their broad faces lying in parallel planes and their narrow faces lying in a pair of spaced parallel planes, said elongated housing including a pair of opposed parallel channels of high heat and electrical conductivity, each of said channels having a bottom portion, a pair of sidewall portions extending from said bottom portion, said bus bars being contained within said housing, the broad faces of the outermost bars being in good heat transfer relation with said bottom portions of said parallel channels and separated therefrom by relatively thin electrical insulation, respective portions of at least one of said sidewall portions being in good heat transfer relation with respective narrow faces of said bus bars and being separated therefrom by thin electrical insulation.

2. A unit length of bus duct according to claim 1 wherein said bars are equally disposed in said opposed parallel channels.

3. A unit length of bus duct according to claim 2 wherein said narrow faces of said bars are in in good heat transfer relation with respect to the corresponding opposed sidewall portions of said channels and are separated therefrom by thin electrical insulation.

4. A unit length of bus duct according to claim 1 wherein said bus bars have joint-forming portions for serial connection to like portions of bus bars of a companion unit length of bus duct, said housing including joint cover portions overlying said joint-forming portions of said bus bars, said joint cover portions being adapted to overlie portions of the housing of the companion length of bus duct and being plated with a metal of high electrical conductivity whereby good electrical continuity between the housings of joined lengths of bus duct is assured.

5. A unit length of bus duct according to claim 4 wherein said joint cover portions are separate elements overlying other portions of the housing, said other portions of said bus duct housing being plated with a metal of high electrical conductivity at least where overlain by said joint cover portions.

6. A unit length of bus duct according to claim 1 including a pair of flanges extending oppositely from said wall portions of said channels, each of said flanges of one of said channels abutting the corresponding flange of the other of said channels, first and second pairs of J-shaped members, said pairs being oppositely disposed, means securing said J-shaped members and said flanges together whereby said pairs of J-shaped members stiffen said bus duct.

7. A unit length of bus duct according to claim 6 wherein said channels are aluminum and said J-shaped members are of steel, said J-shaped members being spaced away from said bus bars so as to have minimal effect on the bus duct impedance. stiffeners 8. A unit length of bus duct in accordance with claim 1, wherein each of said channels has a pair of flanges extending laterally outward from the sidewall thereof, the flanges of each of said channels being opposite to respective flanges of the other of said channels as that the housing has a first and second pair of opposite flanges, said elongated housing further including two pairs of elongated stiffeners, each of said stiffeners having first and second elongated integral portions o at right angles to each other, a first pair of said stiffeners having the first portions thereof confronting and joined to said first pair of opposite flanges and to each other, and another pair of said stiffeners having the first portions thereof confronting and joined to said second pair of opposite flanges and to each other, said second elongated portions of each pair of said stiffeners extending oppositely away from said first portions thereof.